United States Patent
Courbon et al.

(10) Patent No.: US 7,357,522 B2
(45) Date of Patent: Apr. 15, 2008

(54) REARVIEW MIRROR ASSEMBLY FOR MOTOR VEHICLES

(75) Inventors: Emmanuel Courbon, Columbia, SC (US); Heinrich Lang, Ergersheim (DE); Wolfgang Seiboth, Bad Windsheim (DE); Stefan Centmayer, Ergersheim (DE)

(73) Assignee: Lang Mekra North America, LLC, Ridgeway, SC (US)

( * ) Notice: Subject to any disclaimer, the term of this patent is extended or adjusted under 35 U.S.C. 154(b) by 0 days.

(21) Appl. No.: 11/524,590

(22) Filed: Sep. 21, 2006

(65) Prior Publication Data

US 2007/0053087 A1    Mar. 8, 2007

Related U.S. Application Data

(63) Continuation-in-part of application No. 10/941,283, filed on Sep. 15, 2004, now abandoned, which is a continuation of application No. 10/767,669, filed on Jan. 29, 2004, which is a continuation of application No. 09/800,114, filed on Mar. 6, 2001, now Pat. No. 6,830,352.

(51) Int. Cl.
  G02B 7/182  (2006.01)
  B60R 1/06  (2006.01)
(52) U.S. Cl. ........................ 359/872; 359/881; 248/476
(58) Field of Classification Search ................ 359/871, 359/872, 881, 877; 248/475.1, 476, 477, 248/480
See application file for complete search history.

(56) References Cited

U.S. PATENT DOCUMENTS

| | | |
|---|---|---|
| 1,703,704 A | 2/1929 | Anzell |
| 1,848,064 A | 3/1932 | Oishei |
| 2,322,431 A | 6/1943 | Fischer |
| 2,783,015 A | 2/1957 | Kampa |
| 3,189,309 A | 6/1965 | Hager |
| 3,371,903 A | 3/1968 | Thompson |
| 3,372,897 A | 3/1968 | Lee |
| 3,383,152 A | 5/1968 | Ward |
| 3,424,517 A | 1/1969 | Budreck |
| 3,448,553 A | 6/1969 | Herr et al. |
| 3,508,815 A | 4/1970 | Scheitlin et al. |
| 3,522,584 A | 8/1970 | Taibot |
| 3,671,005 A | 6/1972 | Schultz |
| 3,784,149 A | 1/1974 | Brudy |
| 3,936,158 A | 2/1976 | Cianciolo et al. |

(Continued)

FOREIGN PATENT DOCUMENTS

DE    40045382    8/1990

(Continued)

*Primary Examiner*—Ricky D. Shafer
(74) *Attorney, Agent, or Firm*—McNair Law Firm, P.A.

(57) ABSTRACT

A rearview mirror assembly for attachment to a holding tube carried by a vehicle. The assembly includes a housing framing configured to encase a portion of the holding tube and to attach with a mirror element. A clamping bracket is also configured to encase a portion of the holding tube and to attach with the housing frame. A projection formed with one of the housing framing and the clamping bracket is positioned to extend into the holding tube when encased by the clamping bracket and housing framing. Connectors are engaged with the housing framing, clamping bracket and the extension locking them in position relative to each other and the holding tube.

9 Claims, 5 Drawing Sheets

U.S. PATENT DOCUMENTS

| | | | |
|---|---|---|---|
| 4,105,295 A | 8/1978 | Skilliter, Jr. | |
| 4,125,244 A | 11/1978 | Lukey | |
| 4,174,823 A | 11/1979 | Sutton et al. | |
| 4,197,762 A | 4/1980 | Yamana | |
| 4,306,701 A | 12/1981 | Nierhaus et al. | |
| 4,394,066 A | 7/1983 | Sharp | |
| 4,422,724 A | 12/1983 | Otsuka et al. | |
| 4,456,333 A | 6/1984 | Hewitt | |
| 4,488,778 A | 12/1984 | Polzer et al. | |
| 4,500,063 A | 2/1985 | Schmidt et al. | |
| 4,549,786 A | 10/1985 | Albers et al. | |
| 4,623,115 A | 11/1986 | Brester | |
| 4,701,037 A * | 10/1987 | Bramer | 359/874 |
| 4,787,726 A | 11/1988 | Hendricks | |
| 4,867,408 A | 9/1989 | Ozaki | |
| 4,877,214 A | 10/1989 | Toshiaki et al. | |
| 4,877,319 A | 10/1989 | Mittelhauser | |
| 4,883,349 A | 11/1989 | Mittelhauser | |
| 4,896,859 A | 1/1990 | Polzer et al. | |
| 4,915,493 A | 4/1990 | Fisher et al. | |
| 4,929,074 A | 5/1990 | Urban | |
| 4,938,578 A | 7/1990 | Schmidt et al. | |
| 4,951,913 A | 8/1990 | Quesada | |
| 4,988,178 A | 1/1991 | Eifert | |
| 4,991,814 A | 2/1991 | Schmidt et al. | |
| 4,991,950 A | 2/1991 | Lang et al. | |
| 5,022,748 A | 6/1991 | Espirito Santo | |
| 5,031,871 A * | 7/1991 | Ohta et al. | 248/544 |
| 5,044,596 A | 9/1991 | do Espirito Santo | |
| 5,069,539 A | 12/1991 | Valde | |
| 5,074,653 A | 12/1991 | Mittelhauser | |
| 5,081,546 A | 1/1992 | Bottrill | |
| 5,107,374 A | 4/1992 | Lupo et al. | |
| 5,120,015 A | 6/1992 | do Espirito Santo | |
| 5,137,247 A | 8/1992 | Lang et al. | |
| 5,151,824 A | 9/1992 | O'Farrell | |
| 5,160,780 A | 11/1992 | Ono et al. | |
| 5,173,804 A | 12/1992 | Dogey | |
| 5,225,943 A | 7/1993 | Lupo | |
| 5,268,795 A | 12/1993 | Usami | |
| 5,268,797 A | 12/1993 | Santo | |
| 5,327,294 A | 7/1994 | Koske et al. | |
| 5,337,188 A | 8/1994 | do Espirito Santo | |
| 5,355,255 A | 10/1994 | Assinder | |
| 5,432,640 A | 7/1995 | Gilbert et al. | |
| 5,467,230 A | 11/1995 | Boddy et al. | |
| 5,477,390 A | 12/1995 | Boddy et al. | |
| 5,477,391 A | 12/1995 | Boddy | |
| 5,483,385 A | 1/1996 | Boddy | |
| 5,566,030 A | 10/1996 | Yue | |
| 5,568,326 A | 10/1996 | Yoshida et al. | |
| 5,583,703 A | 12/1996 | Lang et al. | |
| 5,604,644 A | 2/1997 | Lang et al. | |
| 5,615,054 A | 3/1997 | Lang et al. | |
| 5,621,577 A | 4/1997 | Lang et al. | |
| 5,657,174 A | 8/1997 | Boddy | |
| 5,687,035 A | 11/1997 | Lang | |
| 5,703,731 A | 12/1997 | Boddy et al. | |
| 5,703,732 A | 12/1997 | Boddy et al. | |
| 5,721,646 A | 2/1998 | Catlin et al. | |
| 5,722,629 A | 3/1998 | Lang et al. | |
| 5,726,816 A | 3/1998 | Gordon | |
| 5,760,980 A | 6/1998 | Lang | |
| 5,786,948 A | 7/1998 | Gold | |
| 5,793,530 A | 8/1998 | Lang | |
| 5,798,882 A | 8/1998 | Lang | |
| 5,823,501 A | 10/1998 | Schmidt et al. | |
| 5,844,733 A | 12/1998 | Ravanini | |
| 5,880,895 A | 3/1999 | Lang et al. | |
| 5,889,627 A | 3/1999 | Englander et al. | |
| 5,925,272 A | 7/1999 | Lang et al. | |
| 6,059,419 A | 5/2000 | Englander et al. | |
| 6,068,380 A | 5/2000 | Lynn et al. | |
| 6,830,352 B2 | 12/2004 | Lang et al. | |

FOREIGN PATENT DOCUMENTS

| | | |
|---|---|---|
| DE | 4010083 | 10/1991 |
| DE | 19840004 | 3/2000 |
| EP | 0 590 510 | 4/1994 |
| EP | 0 659 609 | 6/1995 |
| EP | 1 216 883 B1 | 10/2003 |

* cited by examiner

REARVIEW MIRROR ASSEMBLY FOR MOTOR VEHICLES

CROSS REFERENCE TO RELATED APPLICATION

This application is a Continuation-in-Part of U.S. application Ser. No. 10/941,283, filed Sep. 15, 2004, now abandoned which is a continuation of U.S. application Ser. No. 10/767,669, filed Jan. 29, 2004, which is a continuation of U.S. application Ser. No. 09/800,114, filed Mar. 6, 2001, now U.S. Pat. No. 6,830,352. Priority is claimed.

FIELD OF THE INVENTION

The invention concerns a rearview mirror, especially for motor vehicles.

BACKGROUND OF THE INVENTION

DE 198 40 004 A1 discloses a rearview mirror for motor vehicles in which a mirror support element is a carrier plate with a honeycomb structure. The mirror housing with the mirror framing, the mirror element with its pane, and the adjustment apparatus are fastened to the carrier plate. The carrier plate with the honeycomb structure is secured to a holder by means of a clamping mechanism and the holder, in turn, is attached to the body of the vehicle. A mirror of this type possesses a high degree of stability, a relatively low weight, and only a small tendency toward vibration.

A comparable mirror arrangement is described in EP 0 590 510 A1 and DE 40 10 083, which each exhibit a carrier plate as the carrying element but without a honeycomb structure.

A disadvantage of this type of mirror arrangement is its comparatively heavy weight as found, for example, in the version of EP 0 590 510.

SUMMARY OF THE INVENTION

The present invention improves the lighter rearview mirror structure of DE 198 40 004 A1 with the necessary stability.

The present invention provides reduced structure for securing the rearview mirror with the holding member. By providing a first clamping part in the mirror housing framing and a second clamping part in the clamping bracket itself, which mounts the mirror element, a carrier plate may be dispensed with. Removing the conventional carrier plate leads to a reduction in weight. Since the carrier plate is no longer required, the number of the system parts or components is reduced compared to the state of the technology, which results in a simpler mounting procedure and also reduces the costs of manufacture.

In accord with an advantageous embodiment of the present invention, the clamping bracket is made out of a more rugged material than the mirror housing framing.

Accordingly, the bracket becomes an important carrying component onto which the characteristic mirror pane is fastened along with a positioning apparatus. Since the entire extent of length or width of the mirror housing framing is available for the clamping connection, the clamping bracket can now be fastened essentially in a large surface mode, so that it is possible to manufacture the clamping bracket from a reinforced plastic such as glass fiber reinforced plastic. Alternatively, the clamping bracket can naturally be made of metal.

In accord with a preferred embodiment of the invention, the clamping bracket fits into one side of the mirror framing with slip-in catches and is screwed into the mirror framing on the other side. This type of connection reduces the number of screwed connections and simplifies the mounting.

Following another advantageous embodiment of the invention, the mirror element includes a mirror pane, upon which a glass carrier plate is installed. The carrier plate is driven by a motor, preferably electric, for positioning adjustment. The positioning adjustment or apparatus, and thereby the entire mirror element, are screwed onto the reinforced clamping bracket, which acts as the carrying element. This, too, contributes to simplifying the mounting.

In accord with yet another advantageous embodiment of the invention, a rimless glass carrier plate is employed, which allows the mirror pane to extend slightly beyond the glass carrier plate and the carrier plate. Thus, the glass carrier plate possesses no border or peripherally running rim which encloses the glass pane of the mirror. By dispensing with the enclosing rim for the glass carrier plate, with an outside design of the same dimensioning, optimum use is made of the glass area.

In accord with yet another advantageous embodiment of the invention, the mirror housing includes a mirror housing cover, which is releasably bound, or can be so bound, to the mirror housing framing by means of a snap-in connection. Since the mirror housing cover plate fulfills no carrying function, it may be manufactured with very thin walls and light in weight. By means of the snap-in connection, the cover plate can be easily disconnected and can also be lacquered in a simple manner with colors specified by the customer.

In a further advantageous embodiment of the invention, the clamping bracket, and/or the mirror framing in the area in which the holding part is located, there are provided securing members which penetrate and engage with the holding part locking the clamping bracket and/or mirror framing in position against rotation about the holding part.

In accord with yet another embodiment of the invention, the framing part possesses an opening in the area of the securing members allowing a securing member access to the holding member.

BRIEF DESCRIPTION OF THE DRAWINGS

Further details, features and advantages of the invention arise from the following description of preferred embodiments with the aid of the drawings. There is shown in.

DETAILED DESCRIPTION OF THE INVENTION

Figure 1:
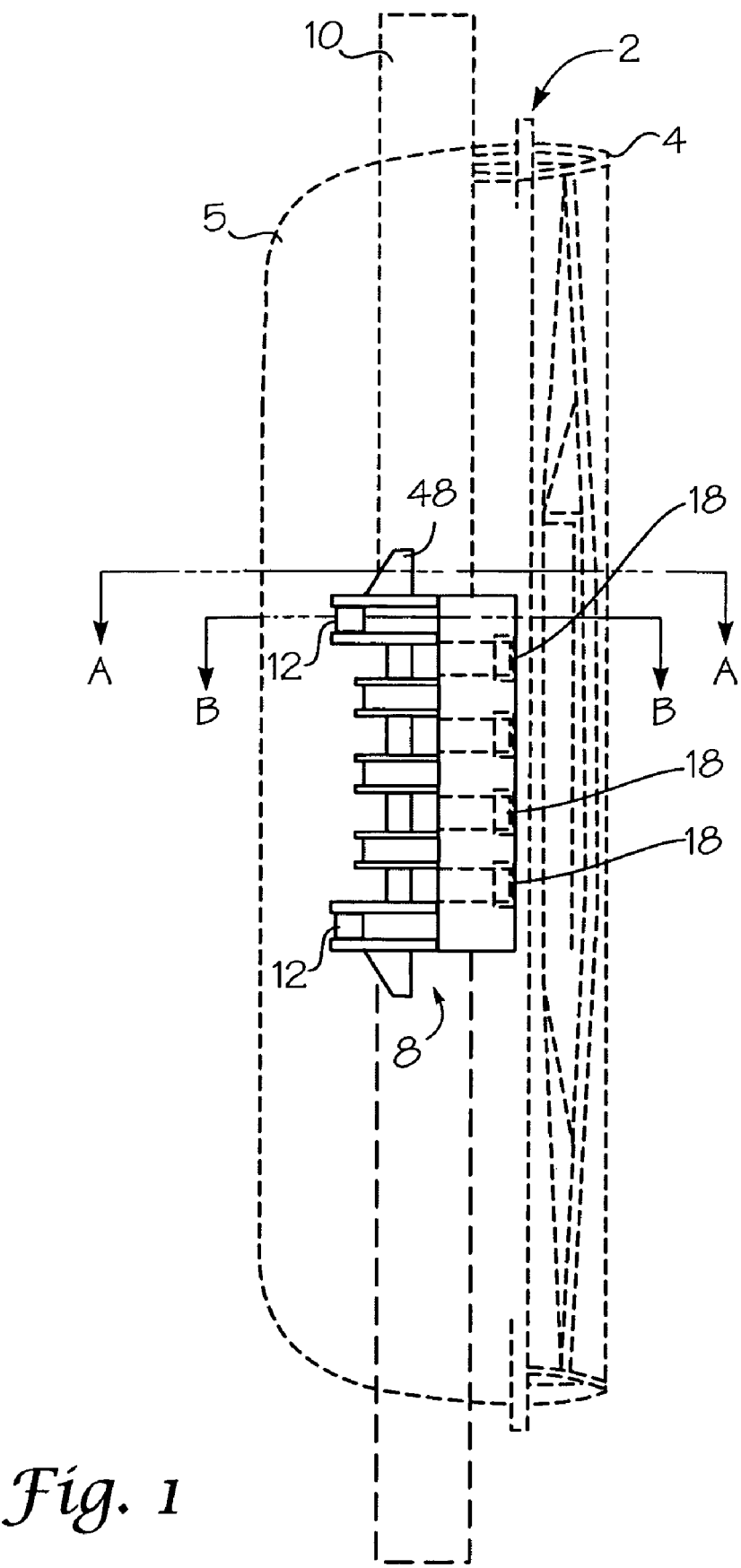
FIG. 1 is a side view of a first embodiment of the invention particularly showing a clamping bracket with surrounding elements shown in phantom.

Reference will now be made in detail to the presently preferred embodiments of the invention, examples of which are illustrated in the drawings. The examples are provided by way of explanation of the invention and are not intended as limitations of the invention. For example, features illustrated or described as part of one embodiment can be used on another embodiment to yield yet a third embodiment.

Accordingly, it is intended that the present invention include such modifications and variations.

Figure 2:
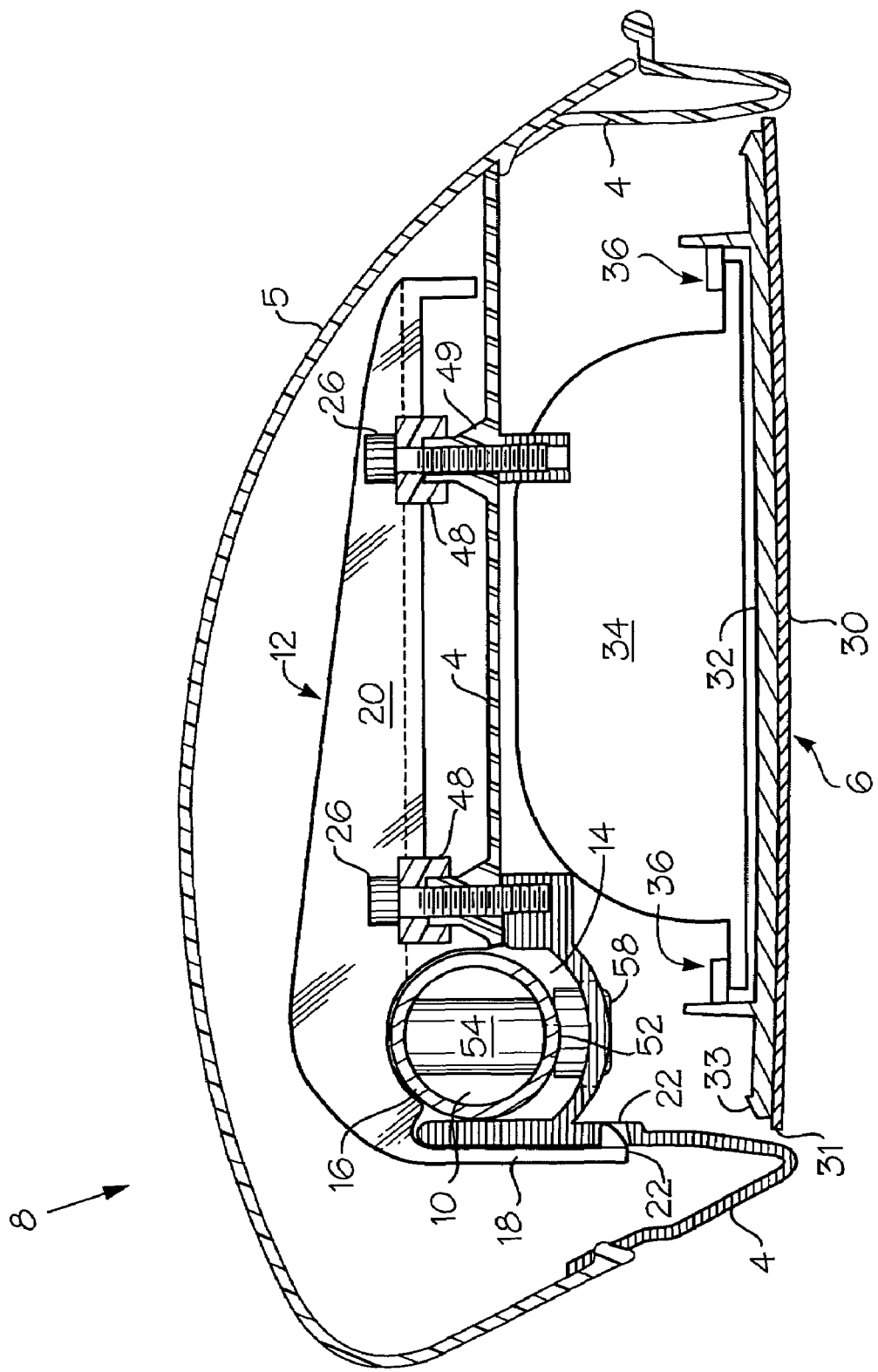
FIG. 2 is a sectional drawing along the section line A-A of FIG. 1.
Figure 3:
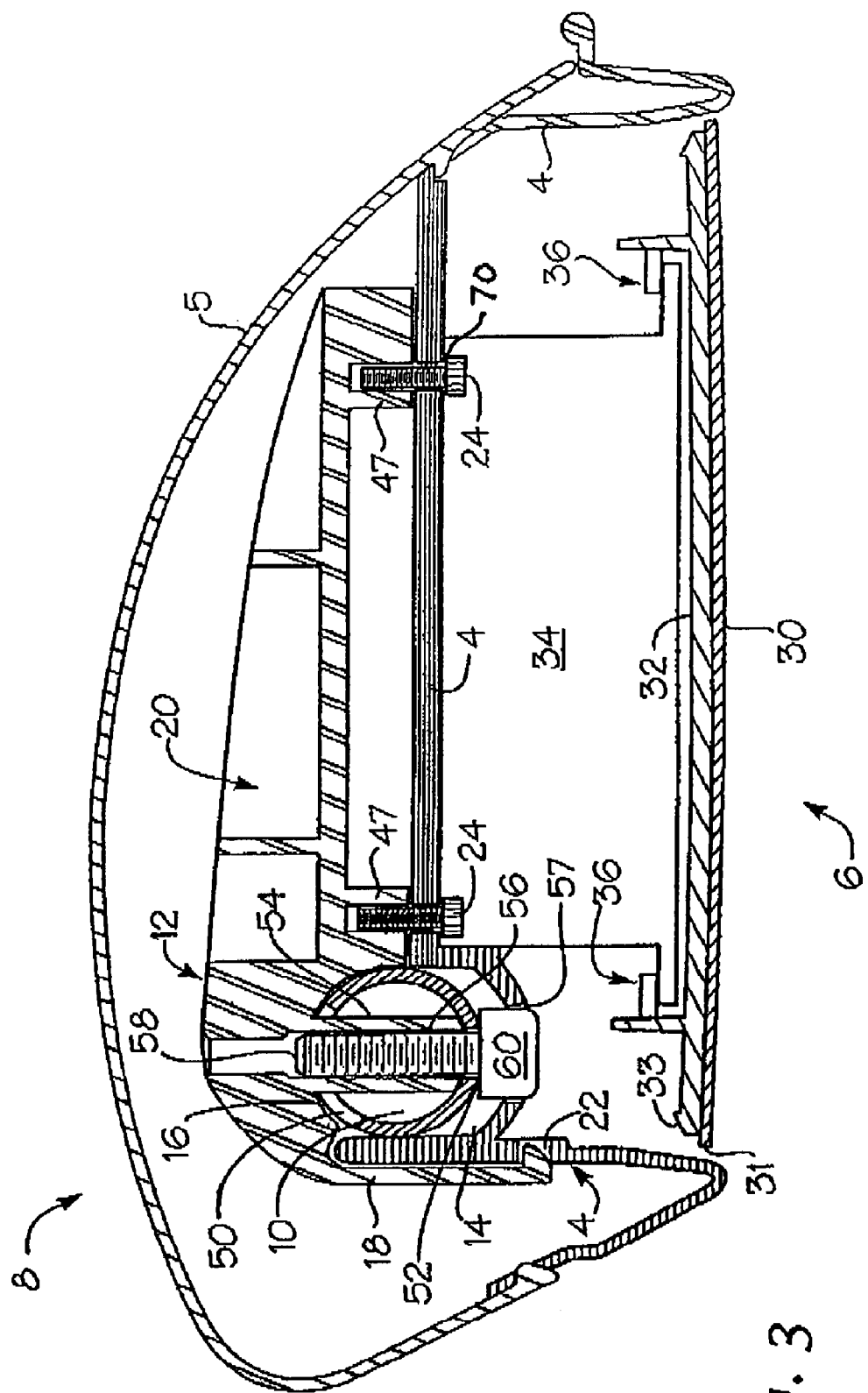
FIG. 3 is a sectional drawing along the section line B-B of FIG. 1.

Turning now to the drawings, the primary first embodiment of the invention as shown in FIG. 1 as a side view, depicting a mirror housing 2, which includes a mirror housing framing element 4 and a mirror housing cover 5. Within the mirror housing 2 is located clamping bracket 12, housing framing element 4 and a mirror element 6 as shown in FIGS. 2 and 3. The entire rear view mirror is fastened by means of clamping connection 8 onto a holding part or holder tube 10. Tube 10 may be a continuous tube or it may be comprised of two tubes separated in the center. The clamping connection 8 comprises, as best seen in FIGS. 2 and 3, a first clamping part in the form of the mirror housing framing or framing element 4 and a second clamping part in the form of a clamping bracket 12.

As may be inferred from the sectional drawings in FIGS. 2 and 3, the mirror housing framing 4 possesses a through-like recess 14 within which the holder tube or element 10 is partially encased. The clamping bracket 12 possesses a similar trough-like recess 16. Recess 14 may engage with or may be spaced from or both the outer surface of tube 10. In any case, opposed trough-like structures 14, 16, completely or nearly completely circumferentially encase holder tube 10 and a large surface is made available for the transmission of forces. Extending in a first direction from the trough structure 16 of the bracket 12 are a plurality of hook elements 18 which extend in comb-like fashion. Extending from the other side of the trough structure 16 is part 20 of the brackets 12 with extensions 48 (FIG. 2) which receive screw fastenings or connectors in the form of screws 26. The hook elements 18 fit into a corresponding hook opening 22 in the mirror housing framing 4. As one can see in FIGS. 2 and 5, the part 20 of the clamping bracket 12 is connected to the mirror housing framing 4 by means of four screws or connectors 26 which pass through extensions 48 and secure in receptor openings 49 formed in mirror housing 4.

Figure 5:
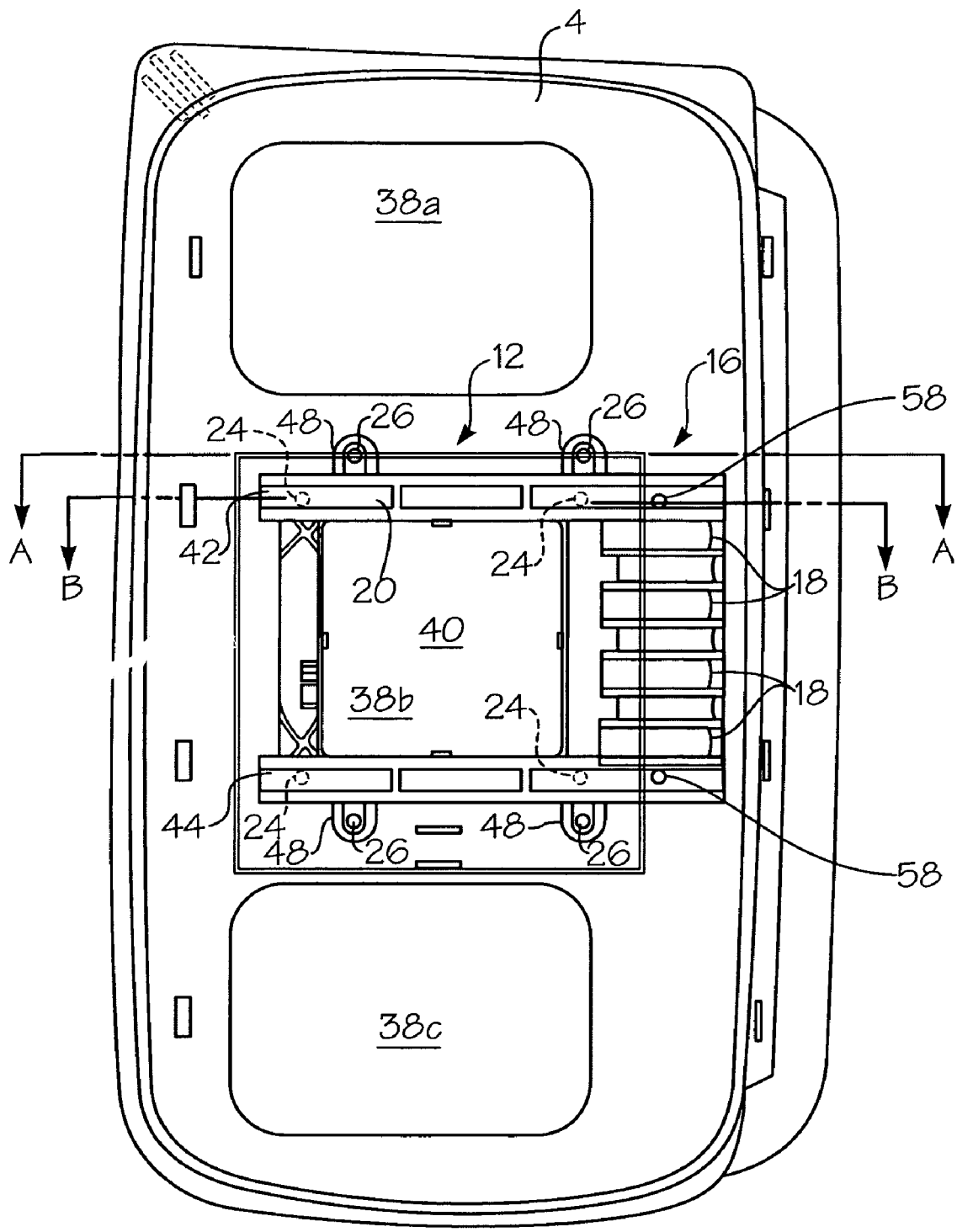
FIG. 5 is a plane view of the mirror housing framing from the rear.

FIGS. 3 and 5 show the mirror element 6, which includes mirror pane 30, a glass carrier plate 32 and an electric motor driven mirror positioning apparatus 34 connecting with clamping bracket 12 by way of connectors or screw elements 24 which pass through apertures or openings 70 In housing framing 4 and engage with receptors 47. More specifically the mirror adjustment apparatus 34 is fastened onto the part 20 of the clamp bracket 12.

The four screw connectors or connections 24, i.e. screws, enter receptors 47 of the part 20 of the clamping bracket 12 (in FIG. 3) from the side proximal to the mirror pane 30. The glass carrier plate 32, with its attendant mirror pane 30, is fastened onto the mirror positioning apparatus 34 by means of a detent connection 36. The glass carrier plate 32 is without a surrounding rim construction, as discussed in EP 0 659 609 B1, and a periphery 31 of the mirror pane 30 extends slightly outward beyond a periphery 33 of the glass carrier plate 32. To this extent, EP 0 659 609 B1 is incorporated herein by reference.

FIG. 5 shows a view of the mirror housing framing 4 from the rear without the mirror element 6. The mirror housing framing 4 possesses three openings 38a, 38b, 38c for internal installation purposes and for weight reduction. The somewhat rectangular clamping bracket 12 exhibits between edge strips 42, 44 of screwed-on part 20 an opening 40, which overlaps the central opening 38b (shown in phantom) in the mirror housing framing 4. As best seen in FIGS. 2, 3 and 5, the upper and lower edge strips 42, 44, respectively, are provided the four extensions 48 receiving connectors or screws 26 for connecting the clamping bracket 12 with the mirror housing framing 4. On the upper and the lower strips 42, 44 as shown in FIGS. 3 and 5 are four screw connectors 24 which pass through openings in the mirror positioning adjustment apparatus 34 and engage with four receptors 47, carried by part 20, for the screw connection of the mirror positioning adjustment apparatus 34 to the clamping bracket 12.

Figure 4:
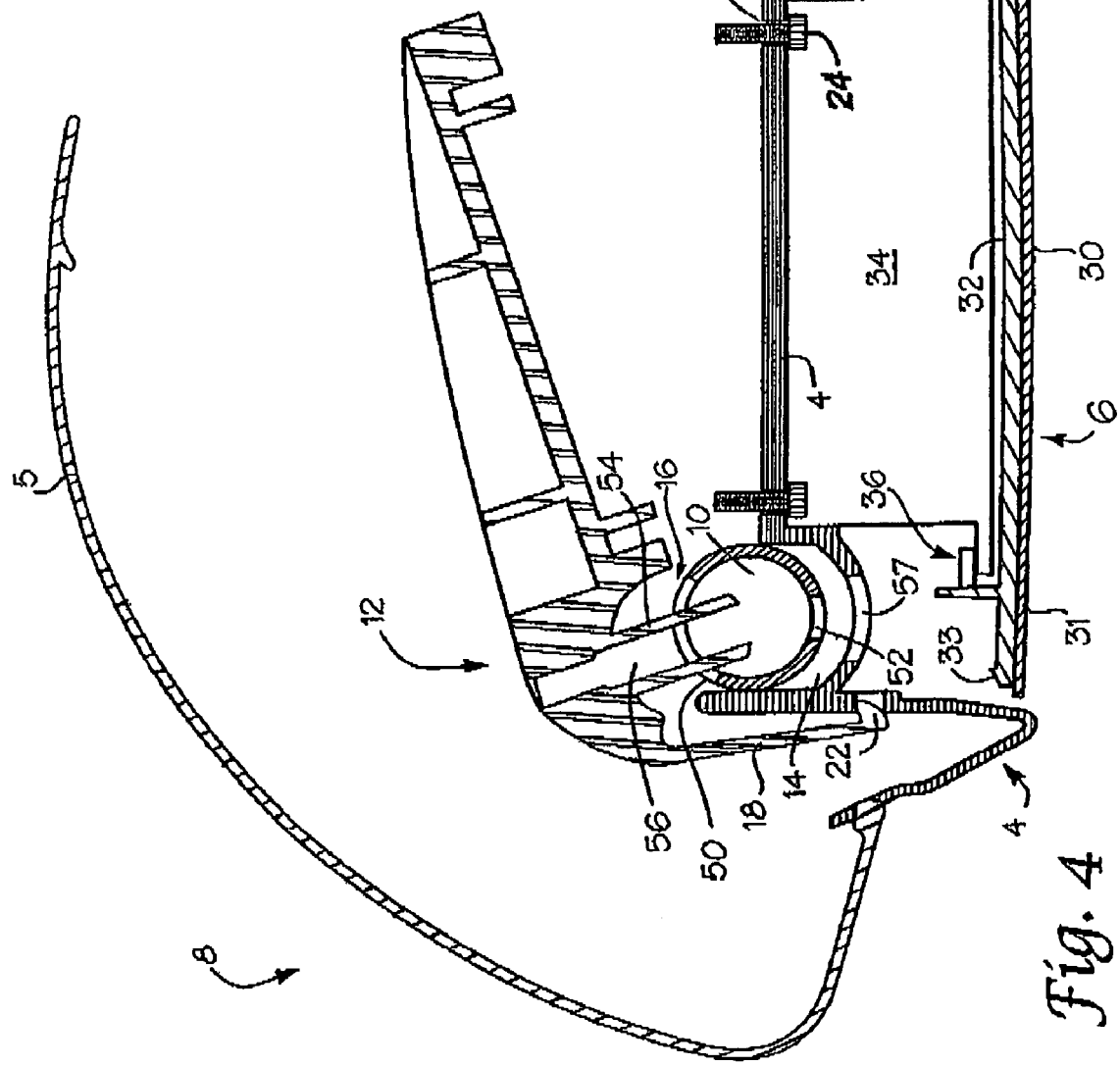
FIG. 4 is a sectional view along line B-B of FIG. 1 showing the manner of positioning the framing member with the clamping bracket for engagement therewith.

As can be seen in FIGS. 2-4, holding tube or member 10 is provided with spaced transverse slots or slits 50 which are arranged opposite a pair of bores 62. The slits and bores, which extend over approximately ⁄1;4" of the circumference of tube 10, are axially spaced a distance equal the spacing of strips 42, 44. Along the inner surface of trough 16 there are provided a pair of projections 54 which include an inner threaded bore 56. A pair of second bores 57 are provided through housing framing 4 at generally the apex of trough 14 and are aligned with bores 52.

Screw or fastening members 58 are provided for engaging with threaded bore 56 of projection 54. Screw 58 including its head 60 passes through bore 57 with the screw projecting end passing through bore 52 and engaging in threaded bore 56. Screw head 60 engages with the outer surface of tube 10 while the extreme end of projection 54 engages the inner surface of holding member 10. The clamping bracket 12 and housing framing are now securely locked in fixed position with holding tube or member 10.

Figure 3A:
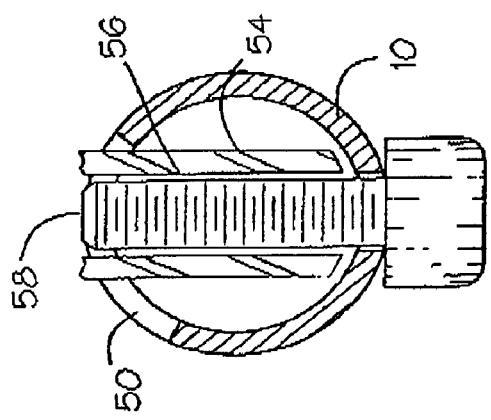
FIG. 3A is an exploded section of the holding tube, the projection and the locking screw.

When mounting the mirror housing 2 with the vehicle as best seen in FIG. 4, first the framing 4 is positioned with recess or trough 14 partially encasing holding member 10 with opening 62 aligned with bore 52. Hook element 18 of clamping bracket 12 is inserted into hook opening 22 of the element framing 4 with projection 54 positioned to penetrate slit 50 of holding tube 10. Clamping bracket 12 is then pivoted to the right aligning threaded bore 56 of projection 54 with bore 52 of holding tube 10 and opening 57 of housing framing 4. The end of projection 54 is now slightly spaced from the inner surface of holding tube 10 as shown in FIG. 3A. Also, the openings in extension 48 are aligned with receptors 49 and receptors 47 are aligned with the bores in mirror adjustment apparatus 34 and housing framing. Screws 26 and 24 are engaged in receptors 49 and 47 securing mirror adjustment apparatus 34 with clamping bracket 12 and framing 4 and clamping bracket 12 together and about holding tube 10. Also, screw or screw connector 58 is passed through opening 57, bore 52 and secured in threaded bore 56 so that the lower surface of head 60 is positioned over the outer surface of holding tube 10 forming bore 52 as shown in FIG. 3A. When screw 58 is tightened, head 60 draws or forces the inner surface of tube 10 into engagement with the end of projection 54, as shown in FIGS. 2 and 3, firmly locking clamping bracket 12 and framing element 4 against movement relative to holding tube 10. The clamping bracket 12 is attached to the mirror housing framing 4 from the front side of the mirror housing 2 by connectors 26 (see FIG. 2). Thereafter, from the back side, the mirror positioning apparatus 34 is screwed onto the openings or receptors 47 of the clamping bracket 12 by screw connectors 24. Following this, the glass carrier plate 32 with the mirror pane 30 is fastened onto the mirror positioning apparatus 34 by means of the detent connections 36. Finally, the mirror housing cover 5 is snapped onto the mirror housing framing 4.

In the case of the embodiment in accord with FIGS. 1-4, the connections, i.e., screw connectors 24 and 26, between first, the mirror housing framing 4 and the clamping bracket 12, and second, the mirror positioning apparatus 34 and the clamping bracket 12, are made by means of two independent sets of connectors or screws 24 and 26 respectively. Alternatively, the mirror positioning apparatus 34, the mirror housing framing 4 and the clamping bracket 12 can also be bound together by a screw connection common to all (not shown).

The mirror housing framing 4 and the mirror housing cover 5 are preferably made of acrylonitrile butadiene styrene (ABS). The clamping bracket 12 preferably is manufactured from glass fiber reinforced plastic, polyamide (PA 6.6) glass fiber (GF 35). For example, the glass carrier plate 32 is advantageously made of ABS with a 30% portion of glass fiber and possesses a thickness in a range between 1 and 1.5 millimeters (nun). The wall thickness of the remaining components varies between 2 and 2.5 mm. By means of these measures, weight and cost reductions are achieved. Furthermore, the vibration tendencies are also reduced.

In certain cases it can also be advantageous to reinforce the trough-shaped recess 14 and the area of the screw connections 24 of the mirror housing framing 4 by means of an inlay of reinforced material (not shown) or to make these areas out of glass fiber reinforced plastic.

It will be apparent to those skilled in the art that various modifications and variations can be made in the present invention without departing from the scope and spirit of the invention. It is intended that the present invention includes such modifications and variations as come within the scope of the appended claims and their equivalents.

What is claimed is:

1. A rearview mirror assembly for attachment to a vehicle via a holding tube, the assembly comprising:
   a clamping bracket configured to receive and attach to the holding tube;
   a housing including a framing element configured to receive the holding tube and disposed opposite of the clamping bracket;
   said clamping bracket further configured to releasably attach with a mirror element;
   a projection carried on one of said framing element and said clamping bracket, said projection being received within said holding tube adjacent a bore through one surface of said holding tube;
   a first connector passing through said bore and engaging with said projection and second connectors attaching said framing element and said clamping bracket together; wherein,
   said first and second connectors secure said framing element, said clamping bracket and said projection in fixed position relative to said holding tube.

2. The rearview mirror assembly of claim 1, wherein the clamping bracket includes a recess adapted to receive a portion of the circumference of the holding tube.

3. The rearview mirror assembly of claim 2, wherein said projection is positioned centrally of said recess.

4. The rearview mirror assembly of claim 1, wherein said holding tube includes a slot positioned opposite said bore, said projection passing through said slot when positioning said clamping bracket about said holding tube in position relative to said framing element.

5. The rearview mirror assembly of claim 1, wherein the clamping bracket is a material selected from the group consisting of reinforced plastic, fiberglass and metal.

6. A rearview mirror assembly with a mirror element for a vehicle, the assembly comprising:
   a mirror element and mirror positioning apparatus;
   a holding component configured to attach to the vehicle;
   a clamping part having at least one extension, a receptor and a recess configured to engage with the holding component said clamping part includes a projection positionable through an opening within said holding component and an engaging element passing through a bore in said holding component engaging with said projection locking said mirror assembly with said holding component; and
   a framing part having at least one receptor and a recess configured to receive the holding component opposite the clamping part;
   a screw connector engaging between said mirror positioning apparatus and said clamping part securing said mirror element, said mirror positioning apparatus and said clamping part together;
   a second screw connector engaging between said framing part and said clamping part securing in superimposed positions said clamping part with said framing part, said mirror element and said mirror positioning apparatus and securing said clamping part and said framing part with said holding component.

7. The rearview mirror assembly of claim 6, wherein said projection end extends to a position adjacent an inner surface of said holding component, said engaging element bringing said inner surface of said holding component into contact with said projection end when tightened.

8. The rearview mirror assembly of claim 6, wherein said engaging element comprises a screw.

9. The rearview mirror assembly of claim 6, wherein said engaging element passes through said framing part when locking said clamping part with said holding component.

* * * * *